US010417412B2

(12) United States Patent
Copty et al.

(10) Patent No.: US 10,417,412 B2
(45) Date of Patent: Sep. 17, 2019

(54) PROTECTING COMPUTER CODE AGAINST ROP ATTACKS

(71) Applicant: International Business Machines Corporation, Armonk, NY (US)

(72) Inventors: Fady Copty, Nazareth (IL); Ayman Jarrous, Shafa-amer (IL); Tamer Salman, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 290 days.

(21) Appl. No.: 15/432,954

(22) Filed: Feb. 15, 2017

(65) Prior Publication Data

US 2018/0232518 A1 Aug. 16, 2018

(51) Int. Cl.
*G06F 21/52* (2013.01)
*G06F 21/56* (2013.01)

(52) U.S. Cl.
CPC ............ *G06F 21/52* (2013.01); *G06F 21/566* (2013.01); *G06F 2221/033* (2013.01)

(58) Field of Classification Search
None
See application file for complete search history.

(56) References Cited

U.S. PATENT DOCUMENTS 7,971,255 B1 * 6/2011 Kc ........................ G06F 21/566 713/164
9,147,070 B2 9/2015 Panchenko et al.
9,250,937 B1 2/2016 Franz et al.
9,372,704 B2 6/2016 Sehr et al.
2006/0064737 A1 * 3/2006 Wallace .................. G06F 21/54 726/1
2011/0116624 A1 * 5/2011 Farrugia ................... G06F 8/51 380/28
2012/0284688 A1 * 11/2012 McLachlan ........... G06F 21/125 717/110
2012/0331308 A1 * 12/2012 Fernandez Gutierrez .................. G06F 21/71 713/190
2013/0124576 A1 * 5/2013 Adir .................... G06F 11/3684 707/803
2014/0282431 A1 * 9/2014 Delio, Jr. ............ G06F 11/3466 717/130

(Continued)

OTHER PUBLICATIONS

Pappas et al., "Smashing the Gadgets: Hindering Return-Oriented Programming Using In-Place Code Randomization", 2012 IEEE Symposium on Security and Privacy, p. 601-615.

(Continued)

*Primary Examiner* — Henry Tsang
(74) *Attorney, Agent, or Firm* — Ziv Glasberg

(57) ABSTRACT

A method, computer product and computerized system, the method comprising: obtaining computer code, wherein the computer code is comprised of code blocks arranged in a first order and providing a functionality, wherein each code block of the code blocks comprises one or more program instructions; determining, by a processor, one or more constraints on reordering the code blocks in a second order, such that a second computer code comprising the code blocks arranged in the second order, when executed, provides the functionality; and providing the constraints to an automatic solver for determining the second order.

14 Claims, 3 Drawing Sheets

RECEIVE REQUEST FOR REORDERING OF COMPUTER CODE 200
HAS COMPUTER CODE BEEN HANDLED BEFORE? 204
YES
RETRIEVE A REORDERING AND PROVIDE RESPONSE 208
NO
DETERMINE BLOCK STRUCTURE AND BLOCK TYPES 212
IDENTIFY AND ANALYZE BRANCH INSTRUCTIONS 216
DETERMINE CONSTRAINTS 220
PROVIDE CONSTRAINTS TO AUTOMATIC SOLVER 224
ACTIVATE SOLVER AND OBTAIN ONE OR MORE SOLUTIONS 228
UPDATE BRANCH INSTRUCTIONS FOR EACH ORDER 232
STORE ORDERS 236

(56) References Cited

U.S. PATENT DOCUMENTS

2015/0047049 A1* 2/2015 Panchenko ............ G06F 21/54 726/26
2015/0106872 A1* 4/2015 Hiser ..................... G06F 21/56 726/1
2015/0143452 A1 5/2015 Hamlen
2016/0119137 A1 4/2016 Sethumadhavan et al.

OTHER PUBLICATIONS

Zhang et al., "Practical Control Flow Integrity & Randomization for Binary Executables", 2013 IEEE Symposium on Security and Privacy, p. 559-573.

* cited by examiner

PROTECTING COMPUTER CODE AGAINST ROP ATTACKS

TECHNICAL FIELD

The present disclosure relates to computer security in general, and to detecting and protecting against Return-Oriented Programming (ROP) attacks on computer programs, in particular.

BACKGROUND

One of the modern software attacks is returned-oriented programming (ROP).

In ROP attacks, no code is injected by the attacker, but rather one or more portions of legitimate code are executed, such that their combined functionality is harmful. As part of a ROP attack, the stack is overwritten, so that when the instruction pointer returns from a call, the overwritten return addresses point to one or more gadgets, being sequences of instructions each ending with a return statement, such that their combined functionality is equivalent to a malicious code as designed by the attacker. Thus, in ROP attacks, chunks of code ending with a return instruction, which exist in a program or in an available library such as kernel32.dll, user32.dll or the like, are used. The chunks of code perform legitimate needed functionality, but are misused to perform malicious activity. Searching for such chunks to be used in an attack is an easy task, and tools exist that are operative in building the addresses that are to be injected to the stack such that these chunks are executed.

BRIEF SUMMARY

One exemplary embodiment of the disclosed subject matter is a method comprising: obtaining computer code, wherein the computer code is comprised of code blocks arranged in a first order and providing a functionality, wherein each code block of the code blocks comprises one or more program instructions; determining, by a processor, one or more constraints on reordering the code blocks in a second order, such that a second computer code comprising the code blocks arranged in the second order, when executed, provides the functionality; and providing the constraints to an automatic solver for determining the second order.

Another exemplary embodiment of the disclosed subject matter is a computerized system having a processor, the processor being adapted to perform the steps of: obtaining computer code, wherein the computer code is comprised of code blocks arranged in a first order and providing a functionality, wherein each code block of the code blocks comprises one or more program instructions; determining, by a processor, one or more constraints on reordering the code blocks in a second order, such that a second computer code comprising the code blocks arranged in the second order, when executed, provides the functionality; and providing the constraints to an automatic solver for determining the second order.

Yet another exemplary embodiment of the disclosed subject matter is a computer program product comprising a non-transitory computer readable storage medium retaining program instructions configured to cause a processor to perform actions, which program instructions comprise: obtaining computer code, wherein the computer code is comprised of code blocks arranged in a first order and providing a functionality, wherein each code block of the code blocks comprises one or more program instructions; determining, by a processor, one or more constraints on reordering the code blocks in a second order, such that a second computer code comprising the code blocks arranged in the second order, when executed, provides the functionality; and providing the at least one constraint to an automatic solver for determining the second order.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

One technical problem handled by the disclosed subject matter is the need to protect a computer against returned-oriented programming (ROP) attacks by preventing the attack.

In some exemplary embodiments, it may be desirable to provide for a robust ROP prevention technique, which has minimal negative effect on the user experience—i.e., avoiding substantial degradation in performance when a protected program is loaded and executed, avoiding substantial increase in resource consumption, or the like.

Figure 1:
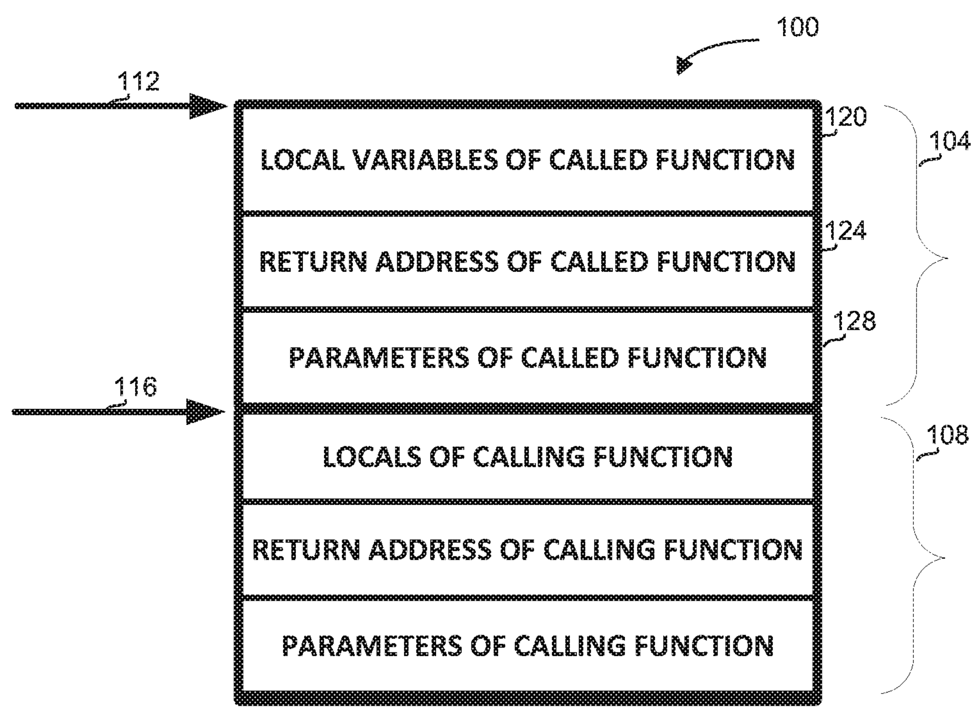
FIG. 1 shows exemplary stack structure and content.

Referring now to FIG. 1, showing typical stack structure, and demonstrating the nature of the ROP attack.

The stack, generally referenced 100 comprises a number of stack frames 104, 108, each associated with a function or a method call, and arranged such that the latest call is at the top of the stack. When a function is called from within an executed function, a corresponding frame 104 is added (pushed) at the top of the stack, thus pushing down frame 108 of the calling function. When the called function returns, its frame 104 is popped out of the stack and control returns to the function that called it by branching to address 124, whose frame 108 is now at the top of the stack.

Each stack frame such as stack 104 frame comprises local variables area 120, return address 124, and parameters area 128.

Stack pointer 112 points to the top frame within the stack, while one or more frame pointers point to each of the frames within the stack at any given time.

A ROP attack or an attempt to a ROP attack may be carried out by replacing one or more return addresses within the stack with addresses of known gadgets, each being a code segment ending with a return instruction, wherein execution of the sequence of the known gadgets, whose addresses are placed in the stack, performs an action desired by the attacker. Typically, a plurality of return addresses would be replaced to allow for malicious activity to be performed using a combination of several gadgets, which by themselves are non-malicious.

A multiplicity of techniques and tools have been suggested against ROP attacks.

Some tools utilize the Address Space Layout Randomization (ASLR) technique, which rearranges the address space by offsetting the entire code or portions thereof by one or more random values, such that targeted gadgets are not where they are expected to be found, and executing code found at the expected addresses will not achieve the attacker's goal. When using ASLR, the code of the program or shared library that contains the gadgets required by the attacker is relocated to a different memory space, namely the code starts at a different address space.

Advanced ROP attacks have been developed to overcome ASLR, in which the attacker tries to guess or otherwise obtain the location of the gadget. In some approaches, the attacker attempts to receive the memory layout, for example by locating elements, such as format strings, that enable the attacker to know the location of the code, compute the offset, or the like.

An alternative technique that may be used against ROP attack is Instruction Location Randomization (ILR). In ILR the location of multiple instructions in a program may be randomized, thus preventing the attacker's ability to re-use code segments. When the instructions order is randomized, the attacker cannot use the gadgets and cannot build the gadget sequence. However, ILR may require deep analysis of the code, which is difficult to implement; ILR may require relocation of each reference within the code and therefore incurs high overhead.

A relatively new technique includes analyzing the binary code of the program, identifying code blocks and reordering the blocks, wherein a block is defined as a sequence of instructions ending with an unconditional branch instruction. This technique is described, for example, in U.S. patent application Ser. No. 15/270,007, entitled "PROTECTING COMPUTER CODE AGAINST ROP ATTACKS", filed on Sep. 20, 2016, incorporated in its entirety here for all purposes without giving rise to disavowment. However, this technique has a few drawbacks:

First, as mentioned above, a block is defined by 32-bit branch instruction. However, programs may include also 8- and 16-bit branch instructions, which do not define blocks as detailed above. This causes the number of blocks to be significantly smaller than if these branch instructions would define blocks, and thus significantly reduce the number of possible reorderings. Even further, most blocks are thus larger, and may contain more anchor points which may be potentially identified and help an attacker to identify gadgets and use them maliciously.

It may be noted that the 8- and 16-bit branch instructions, also referred to as limited branch instructions, may allow for a jump within a limited range from the branch instruction, as opposed to the 32-bit branch instruction which may allow jumping to any address. As a result, 8- and 16-bit branch instructions and their target addresses, if moved, should be kept within the acceptable jumping range allowed by the branch instruction.

Second, static blocks, such as data blocks or code blocks that may contain data, should not be moved since instructions refer to their addresses, such that if required data is not found at the expected location, the program may crash. However, indicating that certain blocks are not to be moved, again limits the number of possible reorderings.

Third, random reordering may harm optimization decisions, such as a decision to keep two blocks containing functions that call each other on the same page to avoid excessive page faults. By placing the blocks containing the two functions in a distance, multiple page faults may occur, which may necessitate multiple page swaps that will degrade performance of the program.

Fourth, analyzing the code and determining a reordering is time consuming and might affect user experience, whether during installation of the program or when the program loads. Moreover, the same file may be analyzed on a number of machines during installation, thus performing duplicate operations without sharing their products.

These drawbacks may negatively affect the user experience due to deficient performance of the program or may assist attackers in building ROP attacks that utilize these limitations. Thus, it may be desired to provide a ROP attack prevention that overcomes these drawbacks. Moreover, it may be desired to introduce a degree of randomness, such that even if attacker obtains the reordering applied to the program on one machine, this does not enable the attacker to harm all users.

The term reordering used above and below relates to a second or further ordering of the program blocks in which at least one block is in a different location relatively to other blocks, and wherein the program as reordered provides the functionality of the original program, if executed without the presence of a ROP attack attempt.

One technical solution to the problem relates to performing analysis of the code for identifying code blocks and branch instructions therein. The analysis may be performed so as to define constraints on reordering of the code blocks. The constraints may define limitations on the reordering of the code blocks so as to ensure that the reordering that can overcome the abovementioned limitations. A problem solver, and in particular a constraint satisfaction problem (CSP) solver, may then be executed for obtaining one or more solutions to the problem under these constraints. Using this solution, a block may be defined also when ending with an 8- or 16-bit branch instruction while maintaining the destination address at an acceptable jumping distance, thus increasing the number of blocks and reordering options. This may be done by introducing a constraint that the distance between two blocks in which one command in the first block comprises an 8- or 16-bit branch to a command in the second block, will not exceed the value that can be expressed in 8 or 16 bit, respectively. The constraints may further comprise a constraint per each static block that the block is not to be moved, thus overcoming another drawback.

The constraints may include a continuity constraint, which ensures that other than the first block, the start of each block equals the start of the previous block plus the size of the previous block, such that there are no gaps in the program as reordered. Additionally or alternatively, a continuity constraint may ensure that any reordered block is placed in whole without fragmentations, thereby ensuring that the size of the executable does not change in view of the reordering.

Further constraints may be introduced by a user, for example that every non-static block is moved, that two blocks comprising functions that call each other are reordered such that they remain on the same page for optimization purposes, or the like.

Another aspect of the solution comprises performing the method on a computing platform, referred to as a server, which is not necessarily a computing platform the code will be executed by. The executing computing platform which is used for executing the code is referred to as a client. The reordering results may be stored, and when one or more clients requires a reordering of the program, the clients may send a request to the server, obtain the code as reordered or a reordering plan which can be implemented by the client to reorder the code. In some exemplary embodiments, the reorder request may be issued when the program is installed on the client. In such an embodiment, each installed program is a different variation of the original program, wherein the specific variation is determined during installation. The installed program is then executed as is without performing additional reordering. Additionally or alternatively, the reordering request may be issued when the program is about to be executed. In such an embodiment, each execution may be of a different reordered version of the program, which is obtained on the fly. In such a case, there may be an overhead which may negatively affect the user who may be required to wait for the computation to complete before the program is executed. However, such overhead may be reduced by using previously computed solutions (which may be stored locally or remotely). The overhead may also be reduced by harnessing computational power of a server instead of relying on the potentially limited computational capabilities.

In a further aspect, a server may obtain a multiplicity of solutions to the constraint satisfaction problem, store the solutions, and when a client requests a reordering, the server may provide one of the stored solutions, whether randomly or in accordance with some rules. Such multiplicity of solutions provides for lowering the chances of an attacker to harm additional machines installed with the program, since another machine may have the installed program having a different block order.

One technical effect of the disclosure relates to overcoming drawbacks of reordering as taught by the prior art, including but not limited to handling blocks terminated by short branches, static blocks locations, and avoiding harming optimizations.

Another technical effect of the disclosure relates to performing the reorder determination once, when there are no time limitations, and using the results at later times, for example when the code is to be installed on a client computing platform, when the code is to be executed, or in other setting where a timely response is desired. Moreover, determining the ordering which may comprise heavy computations necessitated by complex constraint problem solving, may be performed on a server which may have computation power superior to that of the clients, while the client only has to receive or reconstruct the binary with relatively small performance overhead.

Yet another technical effect of the disclosure relates to obtaining a multiplicity of solutions, and providing each client with a randomly or otherwise selected solution, such that even if an attacker is able to hack and attack one instance of the program, this is useless in attacking other instances. In some exemplary embodiments, if the client requests a different instance in every execution or every N executions, this may drastically mitigate the risk of ROP attacks. If the client requests an instance to be installed, this may drastically mitigate the risk of overall ROP attacks in other devices, albeit the fact that a malicious user may attempt to perform ROP attacks on the installed instance which remains unchanged over time.

Figure 2:
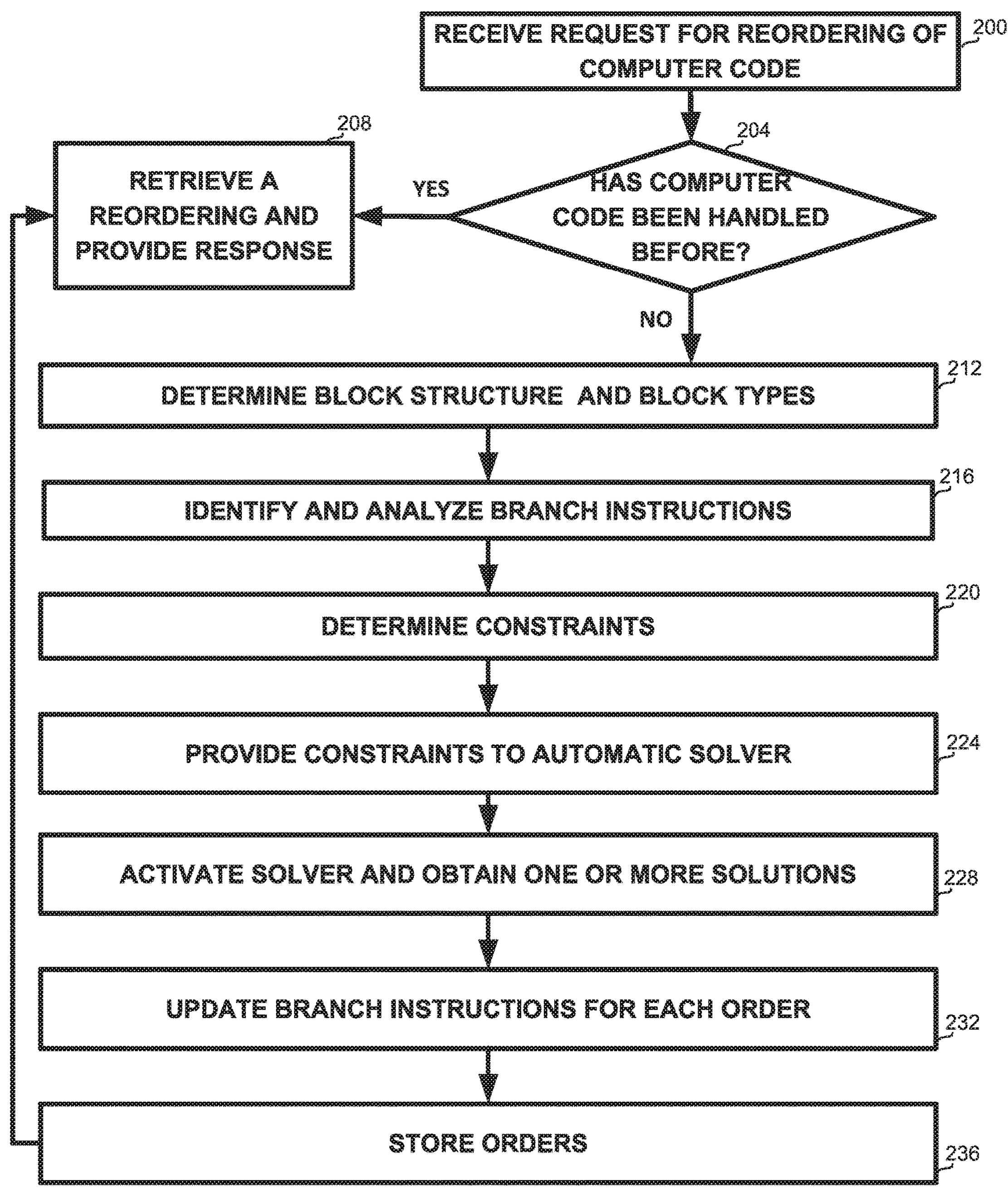
FIG. 2 is a flowchart of steps in a method, in accordance with some exemplary embodiments of the disclosure.

Referring now to FIG. 2, showing a flowchart of the steps in a method, in accordance with some embodiments of the disclosed subject matter.

At step 200, a request may be received for a reordering of a computer code. The request may comprise the computer code itself, or an identifier thereof such as a name, ID, a checksum, a hash value or the like. In some embodiments, the request may be sent by a client to a server. However in other embodiments the request may be sent within the same computing platform. In further cases the request may be received from a computing platform of a developer or a distributor of the program, such that reorderings will be ready once a client wishes to install the program. In some exemplary embodiments, the request may be sent in response to the client attempting to install the program, and a reordered version thereof is to be installed. Additionally or alternatively, the request may be sent in response to the client attempting to execute the program, and a reordered version of the installed program is to be executed.

At step 204, it is determined whether the computer code has already been handled, e.g., whether reordering solutions exist for it. The determination may be performed by comparing the computer code identifier to identifiers of codes for which solutions exist in the systems, or in any other manner. The identifier may be a unique identifier provided by a dedicated system, a checksum value, a hash value, such as using MD5 value, or the like.

In some exemplary embodiments, if the program code is unavailable to the processing entity (e.g., the server), the computer code may be retrieved for analysis. For example, the server may instruct the client to upload the program code for analysis.

If one or more solutions exist, then at step 208 a solution may be retrieved from data storage. The solution may be provided as a response to the request, whether the request was sent from a module on the same computing platform or on a different one. The solution may be a reordering plan to be implemented. Additionally or alternatively, the solution may be a reordered instance of the code. In some exemplary embodiments, multiple solutions may exist. In such a case, a solution may be selected from the available solutions. The selection may be random or pseudo random. Additionally or alternatively, the selection may be performed in accordance with an order of the solutions (e.g., each time providing a next solution according to a predetermined order). Additionally or alternatively, the selection may be performed in accordance with a unique identifier of the requesting computing platform, for example by computing a first hash value based on the identity of the requesting computing platform and selecting a solution having a hash value closest to the first hash value. Additionally or alternatively, the selection may be performed in accordance with a predetermined order that is maintained separately for each computing platform (e.g., for one device, the requests will receive solutions 1, 2, . . . N, and for another device a same or different order may be implemented, and a request by the other device may not increment the next solution to be sent to the first device). Additionally or alternatively, other selection manners may be implemented.

Otherwise, if no solution exists, then at step 212 the block structure and block types of the computer code may be determined. Determining the block structure and block types may include analysis of the binary code, where the structure of the execution file is discovered. In some exemplary embodiments, some blocks may be identified as static data blocks that may not be reordered (e.g., based on header information in the binary file and on analysis of the code. In some embodiments the analysis may be a static analysis. Additionally or alternatively, some blocks may be identified as code blocks which may be reordered. A code block may be composed of a number of instructions and end with an unconditional branch instruction, such as ret, jmp, or the like. Additionally or alternatively, some blocks may not be identified as either data blocks or code blocks. Such blocks may be referred to herein as unidentified blocks.

At step 216, the branch instructions within the code, including conditional and unconditional branch instructions may be identified and analyzed. The instructions may be but are not limited to being of the following format: call <function>; jmp <label>, jze <address>, or the like. For each block, a data structure comprising the following information may be built and populated: a unique identifier of the block; the block length; and the current order of the block within the computer code. In addition, a mapping may be constructed between the blocks, based on the branch instructions, wherein the mapping may be of the following structure: <[source block, instruction branch address], [target block, address of the branch]>. Additionally, for each branch instruction the following information may be determined: the relative location of the source of the branch, i.e., the source block identifier and the displacement of the branch source within the source block; the relative location of the branch target, i.e. the target block identifier and the displacement of the branch target within the target block; and the constraint on the maximal jumping distance, for example: the distance should not exceed +/−$2^7$ (+/−128) for jump short (e.g., 8-bit jump instruction), +/−$2^{15}$ (+/−32768) for jump near (e.g., 16-bit jump instruction), and so on.

On step 220, constraints may be defined, which ensure that the computer code after reordering maintains its functionality, thus constraints may be defined such as but not limited to any of the following:

In some exemplary embodiments, constraints may be defined for a branch instruction having a target address. In some exemplary embodiments, the constraints may be defined for blocks having limited branch instructions. The constraint may be defined based on the maximum possible value of the instruction operand. Such constraint may limit the distance between the source and target blocks when reordered, as such value may be derived from the distance between the relative location of the source and the relative location of the destination. In some exemplary embodiments, the constraint may be based on the address of the source block, identified using its identifier, to which the displacement of the branch source is added, and based on the address of the target block, identified using its identifier, to which the displacement of the target source is added.

In some exemplary embodiments, a constraint may be defined for each static block indicating that the location of the static block remains unchanged.

Additionally or alternatively, a constraint may be defined for each block except the last block, indicating that the block starting address plus the block size equals the start of the next block, thus satisfying continuity, i.e., there are no gaps within the program. In some exemplary embodiments, the continuity requirement may be a soft constraint that is preferably met but may be violated. In some cases, the continuity requirement may be relaxed in order to provide for a total number of solutions that is above a predetermined threshold.

Additionally or alternatively, a constraint may be defined for one or more blocks, indicating that its location should be different from its original location. Such constraint may or may not be a soft constraint. Such a constraint may be useful for blocks which include a potential vulnerability, such as a known gadget or code that is susceptible to being used as a gadget.

Additionally or alternatively, a constraint may be introduced that a minimal number of blocks is moved, that the summed movements of all block exceeds a minimum, or the like. As an example, the constraint may require that at least one block will change its location from the original location, thereby requiring that a solution to the set of constraints is in fact a reordering of the code and not the original code.

Additionally or alternatively, a constraint relating to optimization requirements may be defined. In some exemplary embodiments, a constraint may be related to an optimization such as Relative Instruction Pointer (RIP) or other memory accesses. Such constraints may or may not be defined as soft constraints. As an example, a constraint may be defined so as to ensure that two blocks which are related to each other, are placed in proximity, thereby ensuring that they are loaded together on the same memory page. Such may be the case when a first block comprises a function that calls a function in the other block. Loading the two blocks on the same page may ensure no performance degradation is caused due to excessive page faults. As an example, the constraint may be defined to require that the reordered addresses of the blocks are on the same page, thus maintaining pre-existing optimization.

In some exemplary embodiments, an exemplary constraint problem may be defined as follows: each block entity may be defined by the block identifier, start address, and size.

The following variables may be defined:

a first array having an entry for each block, wherein the order of blocks in the array is the same as the block order in the given computer code;

a second array having an entry for each block indicting the block new location; and a Boolean array having an entry for each block, indicating whether the respective block was relocated.

The following constraints may be defined:

a constraint that ensures that each block is found in the second array, thus indicating that all blocks exist in the reordered code;

a constraint that ensures that the block reordering is unique, meaning, that every reordering is different from other reorderings;

continuity constraints that ensure that other than the last block, the starting address of each block plus the block size equals the start of the next block, thus satisfying continuity, i.e., there are no gaps within the program;

a constraint ensuring that the start of the first block equals the starting load address, if such address is provided, for example indicating a memory location to which the program is loaded or when ASLR is also implemented. If no load address is provided, a default value, such as zero may be assumed;

a constraint that ensures that the Boolean variable in the i-th element of the Boolean array is True if and only if the i-th given block is not the i-th reordered block. This constraint may be introduced if it is required that all blocks are moved; Additionally or alternatively, a constraint may be introduced which ensures that the minimal requested number of blocks have been reordered. Additionally or alternatively, instead of Boolean variable a binary value may be provided and a constraint may be defined on the sum of the array so as to ensure that the sum is above a predetermined threshold (e.g., a minimal number of reordered blocks);

for each branch instruction: a constraint ensuring that the distance between its source and target does not exceed the maximal distance defined in the jump instruction, whether the jump is short, near or far. In some exemplary embodiments, the constraint may be defined only for limited branch instructions. These constraints can be phrased as: $|(TBlockStart+TDis)-(SBlockStart+SDis)| \leq MaxDist$, wherein TBlockStart is the start address of the target block; TDis is the displacement of the target within the target block;

SBlockStart is the start address of the source block; SDis is the displacement of the source within the source block, and MaxDist is a maximal distance requirement defined by the type of branch instruction (e.g., 32-bit, 16-bit, or 8-bit).

In some exemplary embodiments, the constraints defined at step 220 may define a Constraint Satisfaction Problem (CSP). Additionally or alternatively, the constraints may be used to define a Boolean Satisfiability Problem (SAT). Additionally or alternatively, the constraints may be used to define a problem solvable by a theorem prover.

At step 224, the constraints defined at step 220 may define a CSP to be provided to a solver, such as for example a CSP solver, SAT solver, Theorem Prover or the like.

At step 228 the solver may output one or more solutions to the problem, if such exist. In some embodiments, the solver may provide one solution, and may then be run again to provide another solution, and so on until a minimal required number of solutions are obtained. If no additional solution can be found, a notice may be provided to a user, who can relax one or more constraints until a solution is found, or until a sufficient number of solutions is found. In some exemplary embodiments, relaxing the constraints may be performed automatically based on predefined rules. As an example, optimization-related constraints may be initially relaxed one after the other, following by relaxation of pairs of optimization-related constraints, and so forth. In some exemplary embodiments, the relaxation of the constraint may include a reduced requirement of a minimal number of reordered blocks or relaxing the continuity requirement. The rules may define an order of relaxing constraints to be implemented automatically.

The solution may define a reordering plan for the code. The blocks may be reordered according to the unique identifiers of the reordered blocks in the solution. Alternatively, the blocks may be ordered in accordance with the start address of each blocks, as defined in the solution provided by the solver. In some cases, in case continuity is violated, size of gaps may also be ascertainable from the solution and usable in implementing the reordering plan.

At step 232, the branch instructions may be updated in accordance with the instruction address and the updates address of the branch target, taking into account their blocks and their relative addresses within the blocks In some embodiments, a starting load address may be provided with the request, indicating the address from which the binary will be loaded. If no value is provided, a default value such as zero may be assumed and the loading address may be added at a later time.

The branch instructions may be modified and stored for later use, such as for alternative solutions that are not currently being used. In some exemplary embodiments, the modification of the branch instruction in advance may reduce overhead of performing reordering in accordance with the disclosed subject matter.

At step 236, the solutions may be stored, consisting for example of a list of "[block_i^start, block_i^end] moved to [block_i^(new start), block_i^(new end)", or even just the blocks order; and a list of each branch in their new locations and the new operand, for example "[branch new address, new value of the operand]". It will be appreciated that the lists need not be in ASCII or textual, and any format or encoding may be used. The solutions may be stored in persistent memory, in cache, or in any other memory device. In some embodiments, the program code as reordered may be stored.

Once one or more solutions are available, one solution may be provided at step 208 in response to a request. The solution may include the block list and branch instruction list as detailed above. In this case, the client may need to rearrange the blocks prior to installing or loading the program. Alternatively, the server may provide the rearranged code to the client, which may then just install or load it.

It will be appreciated that in some scenarios, a programmer or a distributor of program code can provide the computer code to a server prior to distributing to clients, and once solutions are available on the server, may clients approach the server with requests for reorderings.

It will be appreciated that in some cases, if a request is received regarding code that was not previously handled, and in order to improve performance and reduce overhead, initially a first solution is obtained at step 228, processed and provided in the response at step 208. After the response is handled, additional processing, such as generating additional solutions, processing and storing them (steps 228-236) may be performed in an offline manner, and after the request was already handled. In such a manner, the requesting entity (e.g., client) does not wait until full analysis and the overhead is reduced.

Figure 3:
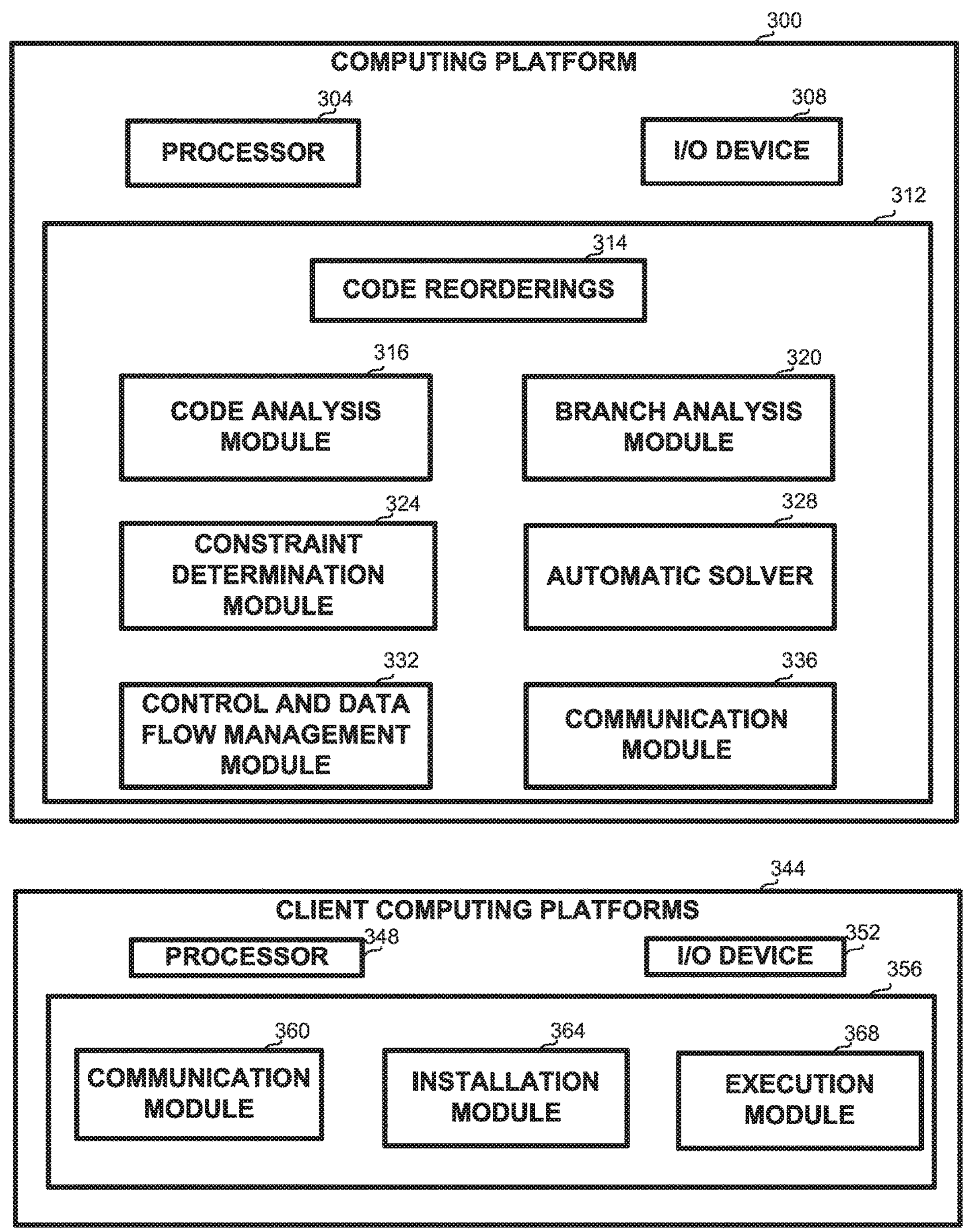
FIG. 3 shows a block diagram of a system, in accordance with some exemplary embodiments of the disclosed subject matter.

Referring now to FIG. 3, showing a block diagram of a system for protecting code against ROP attack, in accordance with some embodiments of the disclosed subject matter.

The system comprises one or more computing platforms 300. In some embodiments, computing platform 300 may be a server, and provide services to one or more client computing platforms 344. In other embodiments, computing platforms 300 and 344 may be implemented on the same computing device.

Computing platform 300 may be accessed by a multiplicity of clients 344 via any communication channel, such as a Wide Area Network, a Local Area Network, intranet, Internet or the like.

Computing platform 300 may comprise a processor 304 which may be one or more Central Processing Unit (CPU), a microprocessor, an electronic circuit, an Integrated Circuit (IC) or the like. Processor 304 may be configured to provide the required functionality, for example by loading to memory and activating the modules stored on storage device 312 detailed below.

It will be appreciated that computing platform 300 may be implemented as one or more computing platforms which may be in communication with one another. It will also be appreciated that processor 304 may be implemented as one or more processors, whether located on the same platform or not.

Computing platform 300 may also comprise Input/Output (I/O) device 308 such as a display, a pointing device, a keyboard, a touch screen, or the like. I/O device 308 may be utilized to receive input from and provide output to a user such as an administrator, a solving system expert, or others.

Computing platform 300 may also comprise a storage device 312, such as a hard disk drive, a Flash disk, a Random Access Memory (RAM), a memory chip, or the like. In some exemplary embodiments, storage device 312 may retain program code operative to cause processor 304 to perform acts associated with any of the modules listed below or steps of the method of FIG. 2 above. The program code may comprise one or more executable units, such as functions, libraries, standalone programs or the like, adapted to execute instructions as detailed below.

Storage device 312 may comprise information such as code reorderings 314. Code reorderings 314 may comprise one or more reorderings for one or more program codes that have been handled. Each such reordering is associated with or comprises an identification of the relevant computer code such as a name, a checksum, a hash value, or the like. Each reordering may further comprise a list of block orders and branch instructions. Alternatively, each reordering may comprise the code as reordered and updated. Thus, when a request is received for a particular program, then if a reordering exists for the program it may be retrieved and provided, otherwise the program is analyzed and handled to obtain a solution.

Storage device 312 may comprise code analysis module 316, for determining the block structure and block types of the program, as detailed in association with step 212 of FIG. 2 above.

Storage device 312 may comprise branch instruction analysis module 320, for determining the branch instructions within the program and their range, and construct mapping between the blocks, based on the branch instructions, as detailed in association with step 216 of FIG. 2 above.

Storage device 312 may comprise constraint determination module 324, for determining constraints based on the blocks, block types, the branch mapping and possibly additional constraints, as detailed in association with step 220 of FIG. 2 above.

Storage device 312 may comprise automatic solver 328, for obtaining one or more solutions to the problem with the constraints determined on step 324, as detailed in association with step 228 of FIG. 2 above. The solver may be a CSP solver, a SAT solver, a theorem prover such as Satisfiability modulo theories (SMT), or the like. In some embodiments, the solver may be implemented on another computing platform, or even provided as a service without a user having access to the solver.

Storage device 312 may comprise control and data flow management module 332 for activating other modules as required, for example determining whether a solution exists to a particular program code, storing and retrieving solutions, or the like.

Storage device 312 may comprise one or more communication modules 336 for communicating with external systems, such as clients requesting service, provisioning of program codes to be analyzed and stored, or the like.

Computing platform 344 may be any client device, such as a desktop computer, a laptop computer, a mobile device such as a mobile phone, a laptop computer, a Personal Digital Assistant (PDA), a server, or the like.

Computing platform 344 may comprise processor 348, I/O device 352 and storage device 356 as detailed above for processor 304, I/O device 308 and storage device 312.

Mobile device 344 may comprise one or more communication modules 360, for issuing requests to and receiving response from computing platform 300.

Mobile device 344 may comprise an installation component 364 which may communicate with computing platform 344 through communication modules 360 for requesting and receiving a reordering plan, reordering the code in accordance with the plan and storing it. Additionally or alternatively, installation component 364 may request and receive a reordered code and may install and store it.

Mobile device 344 may comprise one or more execution modules 368, for receiving a reordered program from computing platform 300, loading and executing it. Additionally or alternatively, execution module 364 may receive a plan such as reordering data, including block listing and updated branch instructions, reorder the program code, load and execute it.

In some embodiments, installation module 364 may receive two or more plans or reordered code, may store them and select one for each execution. If reordering plans are received and stored, the code is reordered in accordance with the selected plan prior to loading and execution, while if reorderings of the code are stored, the selected one is loaded and executed.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:

obtaining computer code, wherein the computer code is comprised of code blocks arranged in a first order and providing a functionality, wherein each code block of the code blocks comprises one or more program instructions;

determining, by a processor, at least one constraint on reordering the code blocks in a second order, wherein the at least one constraint ensures that the computer code after the reordering of the code blocks maintains the functionality, whereby a second computer code comprising the code blocks arranged in the second order, when executed, provides the functionality;

providing the at least one constraint to an automatic solver for determining the second order; and providing the second computer code arranged in the second order based on the at least one constraint.

2. The method of claim 1, further comprising:

receiving the second order determined by the automatic solver;

generating the second computer code based on the second order; and executing the second computer code.

3. The method of claim 2, wherein said determining, said generating and said executing are performed by the processor.

4. The method of claim 2, wherein said executing is performed by a computing platform, wherein said executing is performed in response to installation of the computer code in the computing platform.

5. The method of claim 2, wherein said executing is performed by a computing platform having an installed instance of the computer code installed thereon, wherein said executing is performed in response to execution, by the computing platform, of the installed instance of the computer code.

6. The method of claim 1 further comprising identifying the code blocks within the computer code.

7. The method of claim 1 further comprising:

executing the automatic solver, obtaining a plurality of orders including the second order;

receiving a request for an order;

selecting a selected order from the plurality of orders; and returning the selected order, or code modified in accordance with the selected order.

8. The method of claim 7, wherein the request is received by a first computing platform from a second computing platform and the selected order is returned to the second computing platform, wherein the second computing platform is enabled to execute the computer code ordered in accordance with the order.

9. The method of claim 1, wherein the at least one constraint relates to a distance between a branch instruction and a destination address of the branch instruction being consistent with a field size of the destination address.

10. The method of claim 1, wherein the at least one constraint relates to static block having a same location within the second order as in the first order.

11. The method of claim 1, wherein the at least one constraint relates to two code blocks being on a same memory page in a computerized memory device.

12. The method of claim 1, wherein the automatic solver is selected from the group consisting of: a Constraint Satisfaction Problem (CSP) solver, a Boolean Satisfiability solver and a theorem prover.

13. A computerized system having a hardware processor, the hardware processor being adapted to perform the steps of:
- obtaining computer code, wherein the computer code is comprised of code blocks arranged in a first order and providing a functionality, wherein each code block of the code blocks comprises one or more program instructions;
- determining, by the hardware processor, at least one constraint on reordering the code blocks in a second order, wherein the at least one constraint ensures that the computer code after the reordering of the code blocks maintains the functionality, whereby a second computer code comprising the code blocks arranged in the second order, when executed, provides the functionality;
- providing the at least one constraint to an automatic solver for determining the second order; and
- providing the second computer code arranged in the second order based on the at least one constraint.

14. A computer program product comprising a non-transitory computer readable storage medium retaining program instructions configured to cause a processor to perform actions, which program instructions comprise:
- obtaining computer code, wherein the computer code is comprised of code blocks arranged in a first order and providing a functionality, wherein each code block of the code blocks comprises one or more program instructions;
- determining, by a processor, at least one constraint on reordering the code blocks in a second order, wherein the at least one constraint ensures that the computer code after the reordering of the code blocks maintains the functionality, whereby a second computer code comprising the code blocks arranged in the second order, when executed, provides the functionality;
- providing the at least one constraint to an automatic solver for determining the second order; and
- providing the second computer code arranged in the second order based on the at least one constraint.

* * * * *